United States Patent Office 2,908,111
Patented Oct. 13, 1959

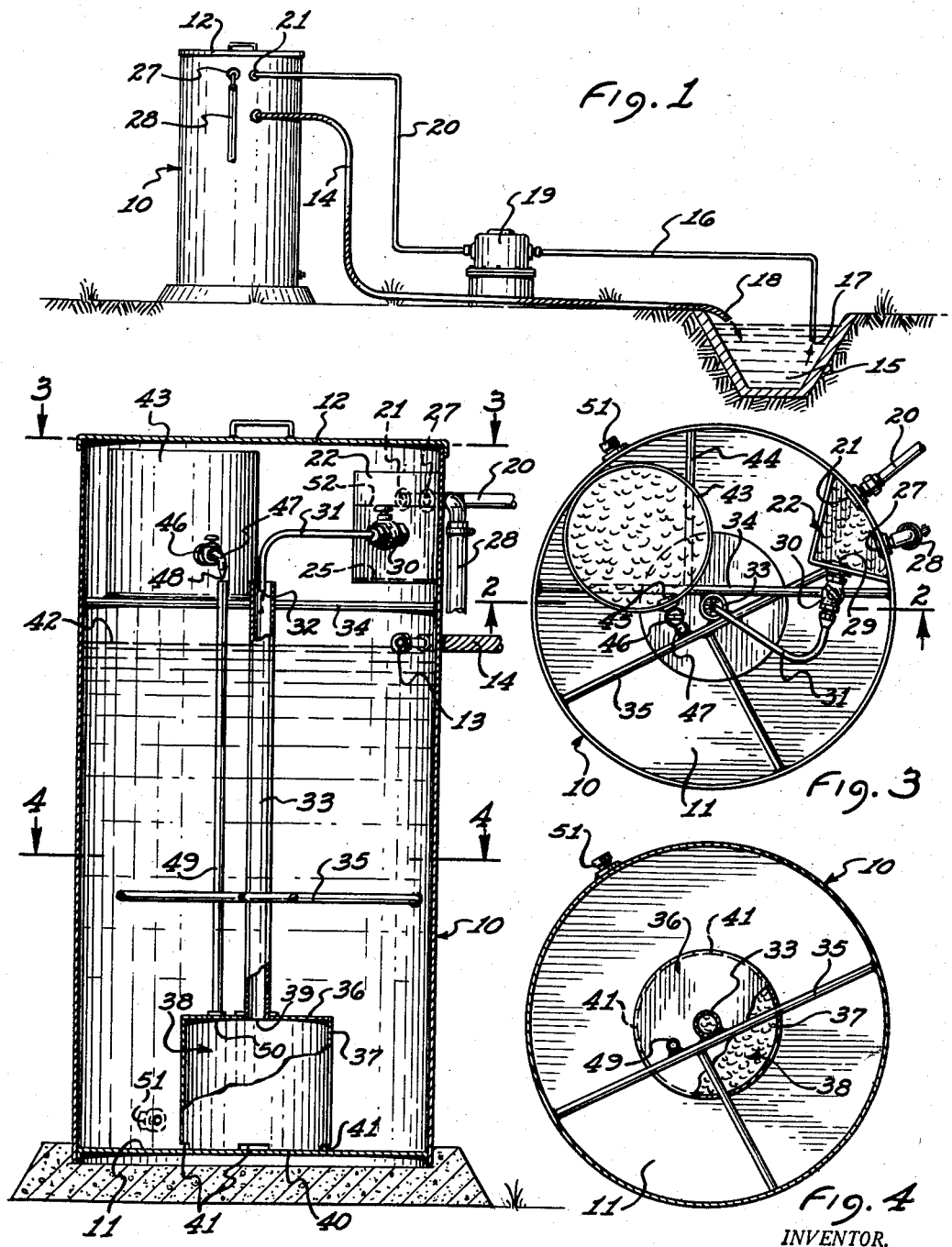

2,908,111

LIQUID ORGANIC PRODUCING AND DISPENSING PLANT OR APPARATUS

Lloyd D. Hazen and Glen R. Kemnitz, Phoenix, Ariz., assignors of twenty-five percent to Royden Brown, Phoenix, Ariz., and twenty-five percent to Glenn W. Lamprecht, Phoenix, Ariz.

Application July 28, 1958, Serial No. 751,404

2 Claims. (Cl. 47—1)

This invention pertains to the construction and operation of a liquid organic producing and dispensing plant.

One of the objects of this invention is to provide means to produce and dispense into irrigation water live organisms and other matter beneficial to the soil and plant life.

Another object of this invention is to provide a liquid organic producing and dispensing plant which is automatic and fool-proof in action.

Still another object of this invention is to provide a liquid organic producing and dispensing plant which is so constructed as to provide a continuous application of materials when water is being applied to the land.

Further features and advantages of this invention will appear from a detailed description of the drawings in which:

Fig. 1 is an elevation of a liquid organic producing and dispensing plant incorporating the features of this invention.

Fig. 2 is an enlarged vertical sectional view showing the interior components of the plant of Fig. 1.

Fig. 3 is a horizontal section on the line 3—3 of Fig. 2.

Fig. 4 is a horizontal section on the line 4—4 of Fig. 2.

The device comprises a main tank 10 having a bottom 11 and a suitable demountable cover 12. A drain or discharge port 13 is provided in the side of the tank 10 to which is connected the distributing hose 14 for dispensing the liquid organic materials in the irrigation ditch 15.

Fresh water intake to the tank 10 is received from the suction line 16 having an intake end 17 located up stream in the irrigation ditch 15 from the discharge end 18 of the line 14. A pump 19 connected to the suction line 16 delivers fresh water through the line 20 which in turn is connected to the inlet port 21 in the side wall of the tank 10 which discharges into the overflow box 22 comprising the sides 23 and 24 and the bottom 25 formed integral with the inside surface 26 of the tank 10. An overflow port 27 is connected to a suitable discharge line 28 for return of excess fresh water to the ditch 15 or other area to be irrigated with fresh water as desired. A discharge outlet 29 in the overflow box 22 is connected to a suitable flow control valve 30 which in turn has a discharge pipe 31 having a discharge end 32 arranged to discharge into a vertically disposed thermo tube 33 which is connected to suitable supporting struts 34 and 35 fixed to the inside surface 26 of the tank 10. The lower end of the thermo tube 33 is fixed to the top plate 36 fixed to the upper edge of the side wall 37 of the propagating chamber 38, the tube 33 communicating with this chamber 38 through an outlet port 39. The lower edge 40 of the side wall 37 has perforations 41 adjacent the upper surface of the bottom 11 of the tank 10 to provide a controlled discharge of liquid from the propagating chamber 38 into the liquid standing at the level 42 of the tank outlet 13.

A supernatant culture reservoir tank 43 supported on the struts 34 and 44 in the tank 10 has a discharge outlet 45 connected through a regulating valve 46 having a discharge pipe 47 with a discharge opening 48 discharging into a second thermo tube 49 supported on the struts 34 and 35 and having its lower end supported on the top plate 36 of the propagating chamber 38, with its lower discharge opening 50 communicating with the chamber 38. A suitable drain plug 51 may be provided for emptying the tank 10.

In operation: With the pump 19 operating, fresh water is maintained at the water level 52 in the overflow box so that a constant head of water is supplied to the discharge outlet 29 and flow control valve 30 so that the latter when adjusted maintains the desired flow in the thermo tube 33. The live culture in the tank 43 is fed through the valve 46 into the thermo tube 49. It will be noted that both thermo tubes 33 and 49 are immersed in the liquid in the tank 10 to the line 42 and the liquid in the tubes stands at the same level. Thus the fluids injected in the tops of the thermo tubes flow slowly down through the tubes so that when the fluids emerge from their lower ends 39 and 50 into the propagating chamber 38 they are at the same temperature as the solution in the tank, the thermo tubes 33 and 49 in the tank fluid functioning as a heat exchanger to effect this result. It is essential to the operation of the plant that the fluid entering the propagating chamber 38 be at substantially the same temperature when they intermix in the chamber 38 to effect the initial propagation of the materials. The settings of valves 30 and 45 are so adjusted that at least 13 minutes elapse before the finished material leaves the plant, this being the minimum time required to complete the initial propagation. After the initial propagation, material in the propagating chamber 38 emerges from the bottom of the chamber out through the perforations 41 and passes through the cultural growth in the tank 10, then up and out through the discharge outlet into the irrigation water.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A liquid organic producing and dispensing plant comprising a tank containing a cultural growth solution, a discharge port at the liquid level of said tank to dispense the fluid therein to irrigation water for plants, a fresh water input supply, a first vertically disposed thermo tube fixed in said tank having its upper open end positioned above the fluid level in said tank, a propagating chamber immersed in the cultural growth solution in the said tank and fixed in the bottom thereof and connected to the lower end of said first thermo tube, means for connecting said fresh water input supply to the top of said first thermo tube, a culture reservoir in said cultural growth solution tank located above the solution therein, a second vertically disposed thermo tube fixed in said tank with its upper open end positioned above the fluid level in said tank, means for conducting fluid from said culture reservoir into the top of said second thermo tube, said second thermo tube having its lower end connected to said propagating chamber, and perforations in said propagating chamber adjacent the bottom of said cultural growth solution tank to allow fluid from said propagating chamber to flow into the cultural growth solution in the bottom of said tank and then upwardly through said solution and out through said discharge port.

2. In a liquid organic producing and dispensing plant as set forth in claim 1 wherein said fresh water input supply includes an overflow box, an inlet port supplying fresh water to said box, an overflow port receiving discharge from said box while maintaining a constant water level therein, and a discharge outlet in said box connected to a flow control valve regulating the flow of fresh water into said first thermo tube.

References Cited in the file of this patent

UNITED STATES PATENTS

| | | |
|---|---|---|
| 2,502,726 | Horton | Apr. 4, 1950 |
| 2,656,648 | Friedmann | Oct. 27, 1953 |